(12) United States Patent
Digman

(10) Patent No.: US 7,870,709 B2
(45) Date of Patent: Jan. 18, 2011

(54) AUTOMATIC LATERAL TILT CONTROL OF A HEADER IN STUBBLE HEIGHT MODE USING MACHINE LEVEL SENSOR

(75) Inventor: Michael J. Digman, Denver, PA (US)

(73) Assignee: CNH America LLC, New Holland, PA (US)

( * ) Notice: Subject to any disclaimer, the term of this patent is extended or adjusted under 35 U.S.C. 154(b) by 59 days.

(21) Appl. No.: 12/392,669

(22) Filed: Feb. 25, 2009

(65) Prior Publication Data
US 2010/0212276 A1 Aug. 26, 2010

(51) Int. Cl.
*A01D 41/14* (2006.01)
*A01D 46/08* (2006.01)
*A01D 75/28* (2006.01)

(52) U.S. Cl. .................................. 56/10.2 E
(58) Field of Classification Search ................ 56/209, 56/10.2 E, 229; 172/4, 2; 701/50, 45, 22; 280/755; 340/689
See application file for complete search history.

(56) References Cited

U.S. PATENT DOCUMENTS

| | | | |
|---|---|---|---|
| 3,269,685 A | 8/1966 | Wallace | |
| 4,535,788 A | 8/1985 | Rowland-Hill et al. | |
| 4,548,214 A | 10/1985 | Sheehan et al. | |
| 4,557,276 A | 12/1985 | Hyman et al. | |
| 4,733,523 A * | 3/1988 | Dedeyne et al. | 56/209 |
| 4,942,724 A | 7/1990 | Diekhans et al. | |
| 4,944,141 A | 7/1990 | Orlando et al. | |
| 4,968,284 A | 11/1990 | Klimmer et al. | |
| 5,359,836 A * | 11/1994 | Zeuner et al. | 56/10.2 E |
| 5,896,731 A | 4/1999 | Scheid | |
| 5,918,448 A * | 7/1999 | Wheeler | 56/10.4 |
| 5,995,895 A * | 11/1999 | Watt et al. | 701/50 |
| 6,389,785 B1 | 5/2002 | Diekhans et al. | |
| 6,510,680 B2 | 1/2003 | Uhlending et al. | |
| 6,592,453 B2 * | 7/2003 | Coers et al. | 460/4 |
| 6,615,569 B1 * | 9/2003 | Carlz | 56/10.2 E |
| 6,615,570 B2 | 9/2003 | Beck et al. | |
| 6,826,894 B2 * | 12/2004 | Thiemann et al. | 56/10.2 E |
| 6,843,719 B1 * | 1/2005 | Sacquitne | 460/101 |
| 6,983,583 B2 * | 1/2006 | Bucher | 56/10.2 R |
| 7,191,582 B2 * | 3/2007 | Bomleny | 56/10.2 E |
| 7,306,513 B2 * | 12/2007 | Mackin et al. | 460/101 |
| 7,603,837 B2 * | 10/2009 | Ehrhart et al. | 56/10.2 E |
| 2006/0142936 A1 * | 6/2006 | Dix | 701/200 |

(Continued)

*Primary Examiner*—Árpád Fábián-Kovács
(74) *Attorney, Agent, or Firm*—Michael G. Harms; Patrick M. Sheldrake

(57) ABSTRACT

A system and method for controlling the lateral tilt of a header of an agricultural plant cutting machine, such as, but not limited to, a combine, windrower or the like, and more particularly, to an automatic lateral tilt control system for precisely controlling an angle of lateral tilt of the header relative to the machine based on a lateral tilt angle of the machine relative to a reference and at least one additional characteristic such that, when the machine is disposed on a laterally inclined surface, and the machine is at a tilt angle differing from an angle of the laterally inclined surface, the angle of lateral tilt of the header relative to the machine is responsively adjusted so an angle of the lateral tilt of the header relative to the reference is substantially equal to the angle of the laterally inclined surface, the system especially useful when operating in a stubble mode and traversing inclined surfaces.

13 Claims, 5 Drawing Sheets

U.S. PATENT DOCUMENTS

2006/0220331 A1* 10/2006 Schafer et al. ............ 280/6.154
2006/0242935 A1* 11/2006 Rayfield et al. ........... 56/10.2 E
2008/0177449 A1* 7/2008 Pickett et al. ................. 701/50
2009/0118913 A1* 5/2009 O'Halloran et al. ........... 701/50

* cited by examiner

AUTOMATIC LATERAL TILT CONTROL OF A HEADER IN STUBBLE HEIGHT MODE USING MACHINE LEVEL SENSOR

TECHNICAL FIELD

This invention relates generally to a system and method for controlling the angle of lateral tilt of a header of an agricultural plant cutting machine, such as, but not limited to, a combine, windrower or the like, when disposed on a laterally inclined surface and more particularly, to an automatic lateral tilt control system which precisely controls an angle of lateral tilt of the header relative to the machine based on a lateral tilt angle of the machine relative to a reference and at least one additional characteristic.

BACKGROUND ART

Agricultural plant cutting and harvesting machines typically have a header which is desired or required to be positioned at one or more selectable cutting heights in relation to the surface, and angles of sideward tilt in relation to the machine itself, as well as to a surface over which the machine is driven. When the header is positioned at a cutting height above the surface, such that the stalks of crops are left at a higher level, the machine is operating in what is sometimes referred to as a "stubble mode". Conventional ground sensing capability is generally only useful when the header is positioned very close to, or on, the surface. Thus typical ground sensing capability, if present at all, is unavailable or inoperable when the machine is operating in the stubble mode.

When the machine is disposed on a laterally inclined surface, downward and sideward forces acting on it can result in tire deformation, ground compaction, and the like on the downhill side. It has been observed that these forces can cause the machine to tilt to a lateral tilt angle that is different, usually greater, than an angle of the laterally inclined surface. Unless tilted relative to the machine, the header is disposed at the same lateral tilt angle resulting in a downhill side of the header riding closer to the surface than an uphill side of the header.

For shorter headers and/or very small differences between the machine tilt angle and the angle of inclination of the surface, the height difference at the ends of the header may not present a problem. However, for longer headers this angular difference causes a more pronounced height difference at the ends of the header such that the downhill side of the header may ride significantly closer to the surface than the uphill side. In some circumstances, this may lead to undesirably uneven cutting height and risks possible damage to the cutting apparatus due to impact with the ground. In this situation an operator typically provides an uphill tilt correction to compensate for the undesired sideward or transverse tilt angle of the header.

It is known to use an inclinometer to provide a lateral tilt angle at which the machine is operating for use with a self-leveling grain cleaning system within the machine. It is desirable to use the lateral tilt angle of the machine provided by the inclinometer to model or predict the lateral tilt angle of the inclined surface so as to provide automatic compensation of the header tilt angle to maintain desired cutting height, to reduce the possibility of damage to the cutting apparatus of the header, and to reduce operator workload.

Thus, what is sought is an automatic lateral tilt control system and method for a header for a plant cutting machine which overcomes one or more of the shortcomings and limitations set forth above.

SUMMARY OF THE INVENTION

What is disclosed is an automatic lateral tilt control system and method for a header for a plant cutting machine which overcomes one or more of the shortcomings and limitations set forth above.

According to a preferred aspect of the invention, the system includes at least one driver in connection with the header configured so as to be controllably operable by a header tilt command input for varying an angle of lateral tilt of the header relative to the machine, and a lateral inclination sensor, such as an inclinometer, configured and operable for providing information representative of the lateral tilt angle of the machine relative to a reference, which can be, for example, horizontal. The system includes a controller programmed and operable for automatically monitoring the information representative of the lateral tilt angle of the machine, and at least one additional characteristic, and uses this information for predicting information representative of the angle of the laterally inclined surface relative to the reference. When the machine is disposed on the laterally inclined surface, and the machine is tilted such that the information representative of the lateral tilt angle of the machine differs by a predetermined amount from information representative of the angle of the laterally inclined surface, the system will responsively adjust the angle of lateral tilt of the header relative to the machine, so an angle of lateral tilt of the header relative to the reference is at least substantially equal to the angle of the laterally inclined surface, while the machine remains at the different angle to the surface.

According to another preferred aspect of the invention, the additional characteristic or characteristics monitored by the controller can include those characteristics that affect the downward and sideward forces and moments acting on the machine. These additional characteristics may include, but are not limited to, rate of change of the angle of the laterally inclined surface, ground speed of the machine, soil or surface characteristics, number of tires, engine load, weight of grain, amount of fuel, characteristics of tires including material, number of plies, type and spacing of tread, and the like.

According to yet another preferred aspect of the invention, the system can include a knowledge base including characteristics with weighted values.

Another embodiment of the invention includes monitoring a differentiation between at least two tires disposed on opposite sides of the machine for a threshold difference in loading conditions experienced by the tires and/or a threshold difference between air pressures in the tires.

According to yet another preferred embodiment of the invention, the predetermined amount of difference allowed between the lateral tilt angle of the machine and the angle of the laterally inclined surface is based on a vertical height of the header above the surface. The predetermined amount is larger, allowing a greater difference between the angles, when the header is positioned at a larger vertical cutting height. Conversely the predetermined amount is smaller, allowing less difference between the angles, when the header is positioned at a lower vertical cutting height.

Still another preferred embodiment of the system includes an operator override capability, wherein the operator can manually override the automatic adjustment of the angle of lateral tilt of the header relative to the machine and the controller is configured and operable to learn from the override.

According to another preferred aspect of the invention, the lateral inclination sensor may be, for instance, an inclinometer of the type that is commonly used with a self-leveling grain cleaning system or any other suitable device capable of providing information representative of the lateral tilt angle of the machine.

DETAILED DESCRIPTION OF THE INVENTION

Figure 1:
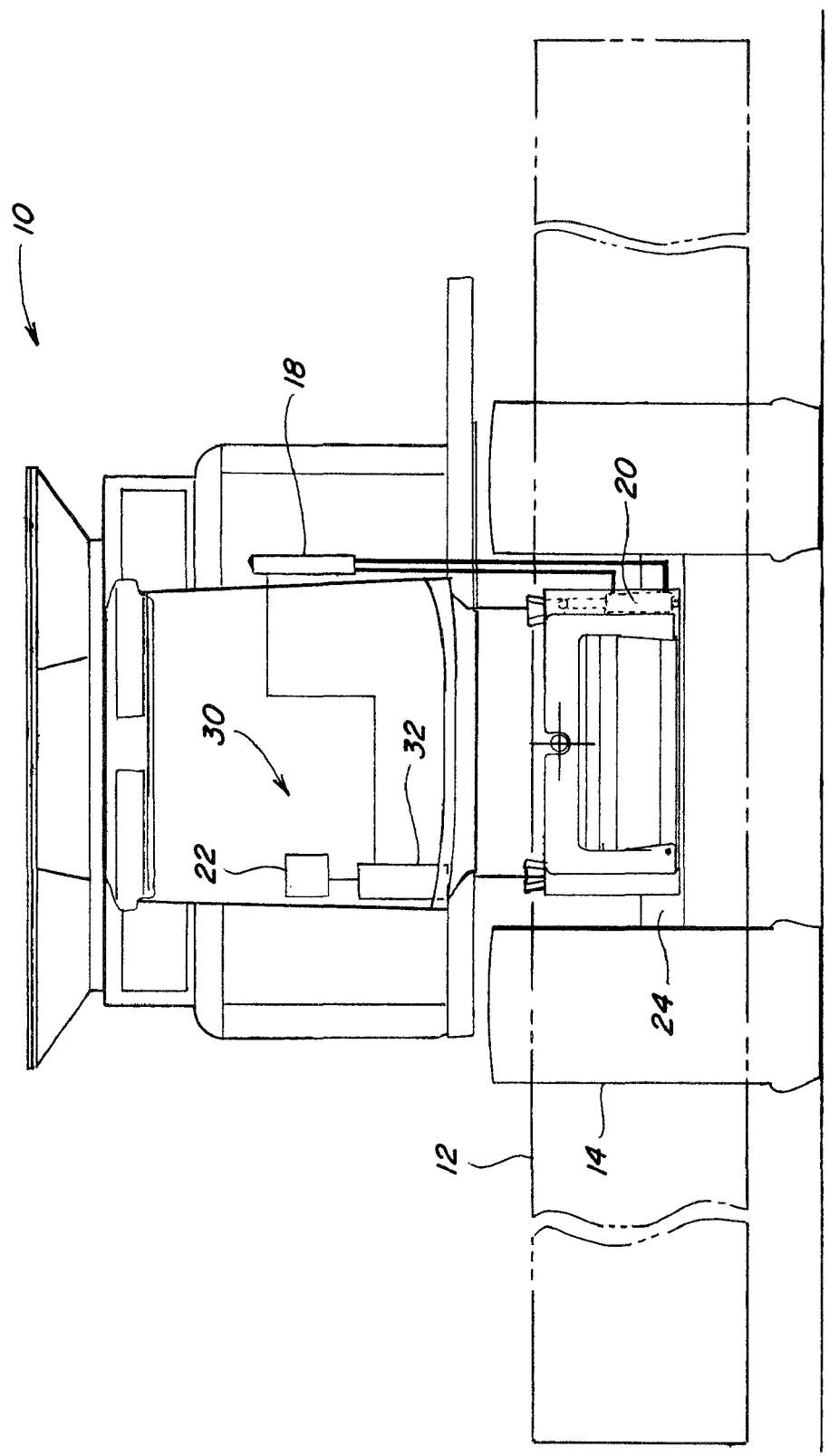
FIG. 1 is a simplified front view of a representative agricultural plant cutting machine including a header for use with the present invention.
Figure 2:
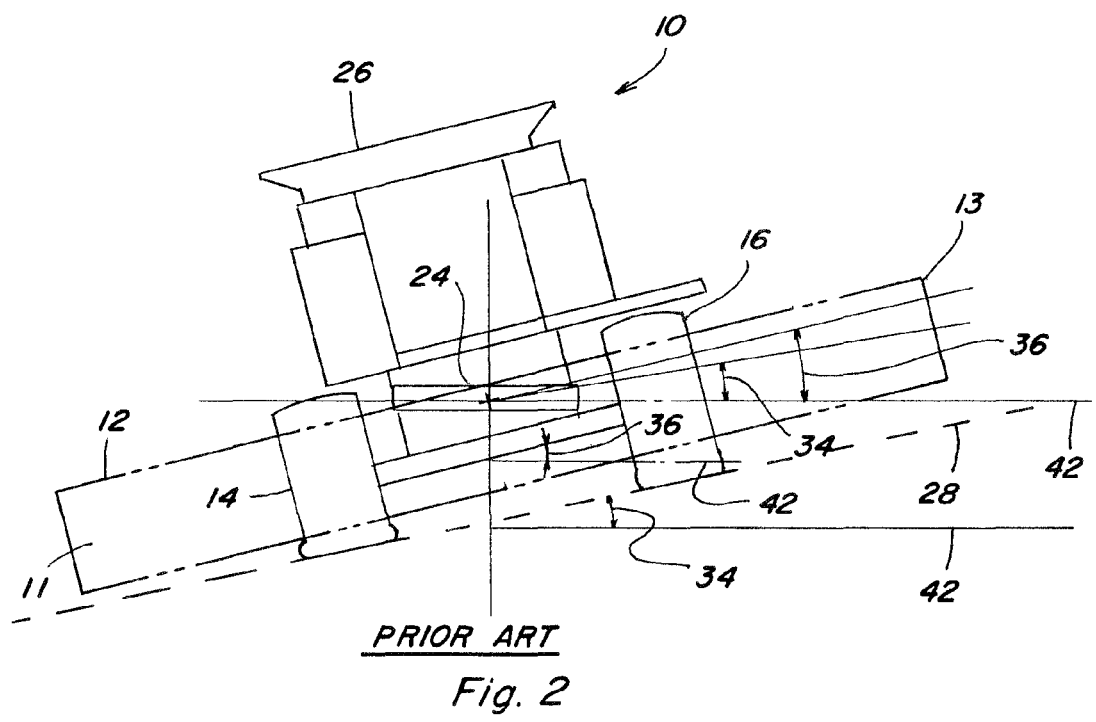
FIG. 2 is a simplified front view of the plant cutting machine of FIG. 1 disposed on an inclined surface depicting an observed situation noted in the prior art.

Referring now to the drawings, FIG. 1 depicts a simplified front view of a representative self propelled agricultural plant cutting machine, such as a combine 10, including a plant cutting header 12 mounted thereon. Combine 10 is intended to be representative of a wide variety of agricultural plant cutting and harvesting machines and other work machines having header 12 which is desired or required to be positioned at one or more selectable cutting heights in relation to the surface, and angles of sideward tilt in relation to the machine itself, as well as to a surface over which the machine is driven. When header 12 is positioned at a cutting height above the surface, such that the stalks of crops are left at a higher level, combine 10 is sometimes referred to as operating in a "stubble mode". Since conventional ground sensing capability is generally only useful when header 12 is positioned very close to, or on, the surface, typical ground sensing capability, if present at all, is unavailable when combine 10 is operating in the stubble mode, i.e. header 12 is positioned at a height above the surface.

As depicted in FIGS. 2-5, when combine 10 is disposed on a laterally inclined surface 28, downward and sideward forces acting on combine 10 can result in greater tire deformation, ground compaction, and the like on the downhill side of the machine, as represented by a downhill tire 14 shown deformed as compared to an uphill tire 16. As a result, combine 10 is at a lateral tilt angle 36 that is greater than an angle 34 of laterally inclined surface 28, both angles measured from a horizontal reference 42, as shown. Accordingly, header 12, unless tilted relative to combine 10, is disposed at the same lateral tilt angle 36 as combine 10 relative to reference 42. It has been observed that this situation, as illustrated by the prior art representation of FIG. 2, often results in a downhill side 11 of header 12 riding closer to surface 28 than an uphill side 13 of header 12. In some circumstances, this may lead to undesirably uneven cutting height and risks possible damage to the cutting apparatus due to impact with the ground.

Figure 4:
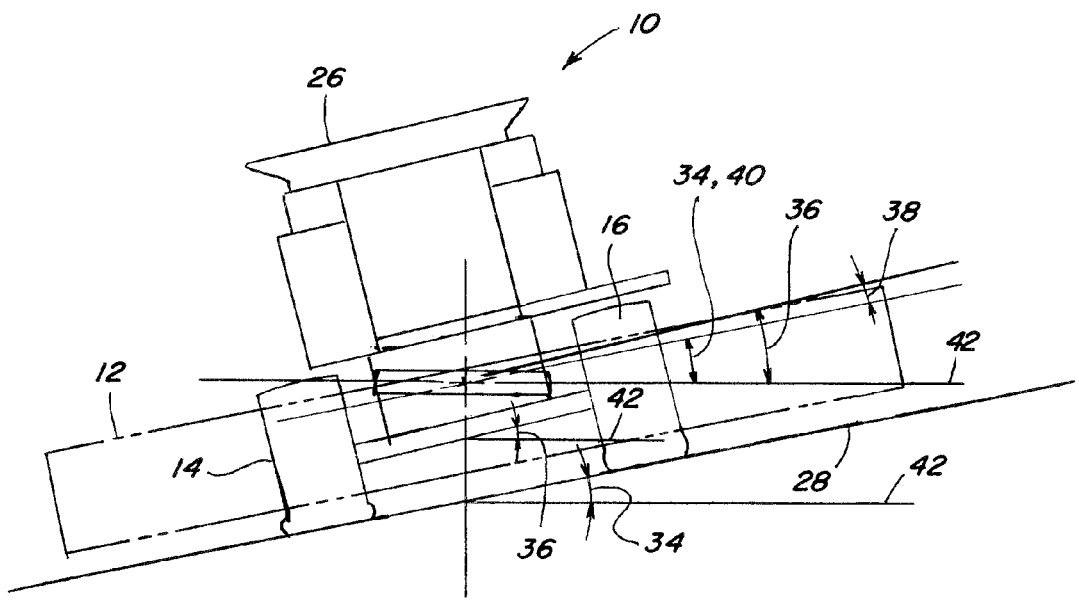
FIG. 4 is a simplified front view of the plant cutting machine of FIG. 1 disposed on an inclined surface according to the invention.

With reference to FIGS. 1 and 4, header 12 is typically tilted relative to combine 10 by at least one driver, such as a hydraulic valve 18 in fluid communication with an actuator 20 for example, which is connected to header 12 and configured so as to be controllably operable by a header tilt command input for varying an angle 38 of lateral tilt of header 12 relative to combine 10. A lateral inclination sensor 22 is configured and operable for providing information representative of lateral tilt angle 36 of combine 10 relative to a reference, in this case, horizontal reference 42.

Figure 7:
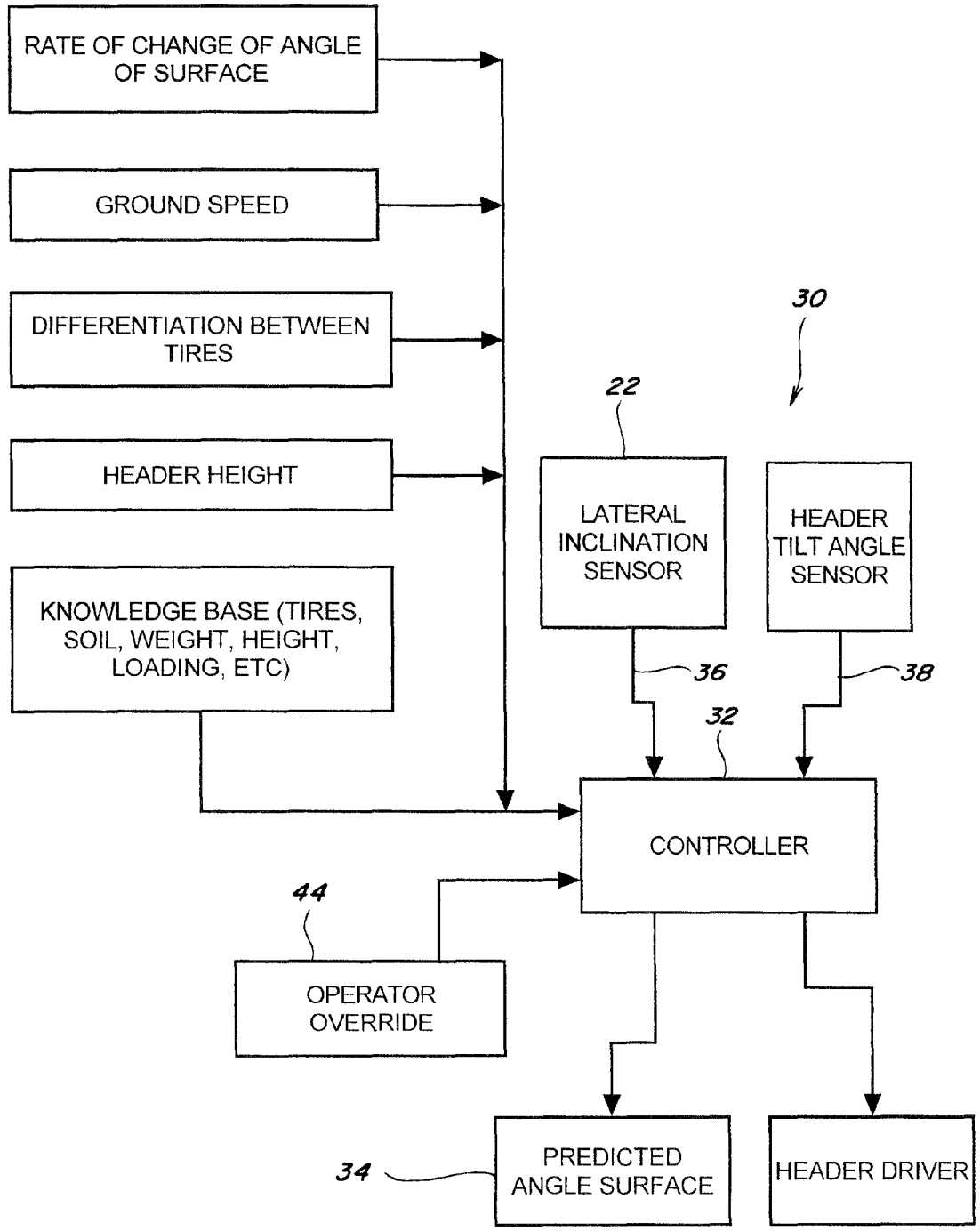
FIG. 7 is a simplified representation of elements and signals for use in the method and control system of the invention.

With reference to FIGS. 4 and 7, according to the invention, an automatic lateral tilt control system 30 includes a controller 32 programmed and operable for automatically monitoring the information representative of lateral tilt angle 36 of combine 10 and at least one additional characteristic for predicting information representative of angle 34 of laterally inclined surface relative to reference 42. System 30 can now compare its predicted angle 34 of laterally inclined surface 28 with its sensed lateral tilt angle 36 of combine 10. When combine 10 is disposed on laterally inclined surface 28 and combine 10 is tilted such that information representative of lateral tilt angle 36 of combine 10 differs by a predetermined amount from information representative of angle 34 of laterally inclined surface 28, system 30 responsively adjusts angle 38 of lateral tilt of header 12 relative to combine 10, so an angle 40 of lateral tilt of header 12 relative to reference 42 is at least substantially equal to angle 34 of laterally inclined surface 28.

Figure 3:
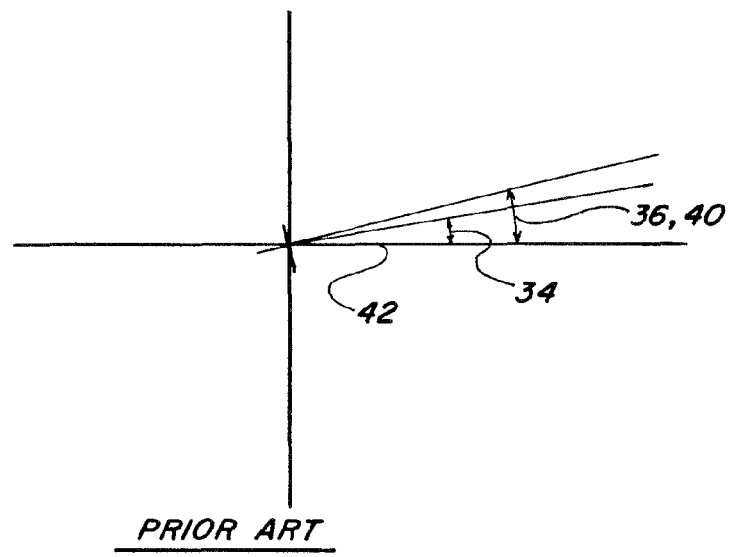
FIG. 3 is a simplified representation of FIG. 2 with the machine removed to facilitate visualization of angles shown in FIG. 2.
Figure 5:
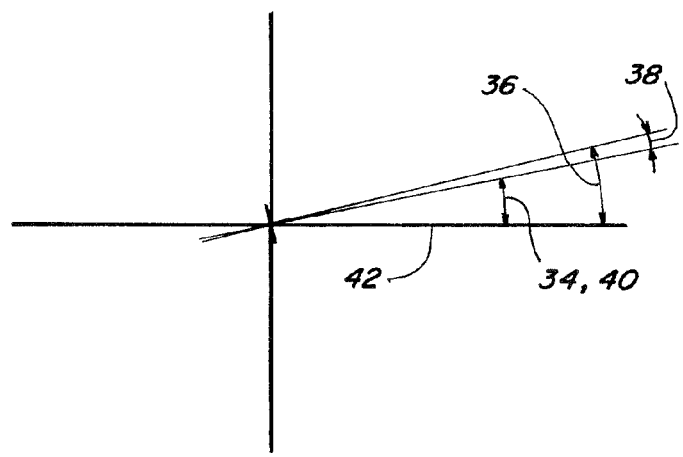
FIG. 5 is a simplified representation of FIG. 4 with the machine removed to facilitate visualization of angles shown in FIG. 4.

FIGS. 3 and 5 are provided to facilitate visualization of angles 34, 36, 38 and 40 with combine 10 removed. For example, in the prior art representation of FIG. 3, angle 40 of lateral tilt of header 12 to reference 42 is the same as lateral tilt angle 36 of combine 10 because header 12 is not tilted relative to combine 10, i.e. angle 38 of lateral tilt relative to combine 10 is zero. It is important to note that in FIG. 5, angle 40 of lateral tilt of header 12 to reference 42 is the same as angle 34 of the laterally inclined surface because system 30 has provided a header tilt command for adjusting angle 38 of lateral tilt of header 12 relative to combine 10.

Figure 6:
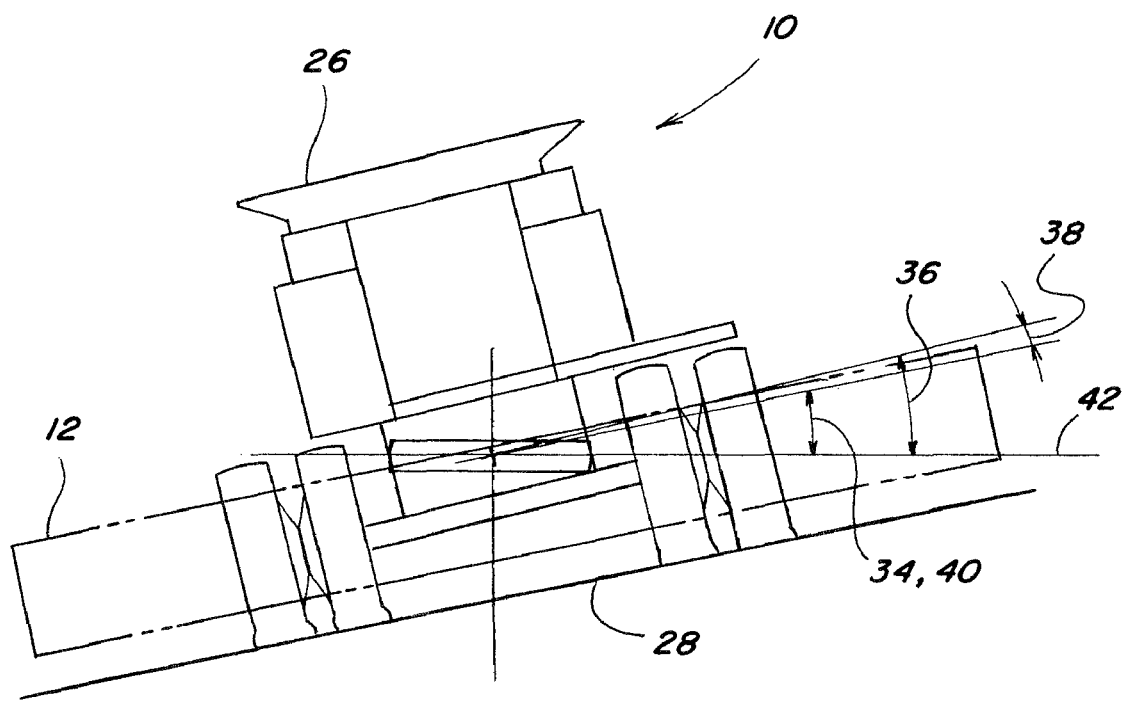
FIG. 6 is simplified front view of a plant cutting machine having dual tires disposed on an inclined surface according to the invention.

FIG. 6 depicts system 30 as used in conjunction with combine 10 equipped with dual tires.

The at least one additional characteristic monitored by controller 32 includes those characteristics that can affect the downward and sideward forces and moments acting on combine 10, particularly at tires 14, 16. As an example, a grain tank 26, located high on combine 10, can create a greater moment of inertia about the center of gravity of combine 10 that urges combine 10 to tilt more "downhill", thus increasing the forces on tire 14, when full than that moment created when grain tank 26 is empty. These additional characteristics may include, as seen in FIG. 7, rate of change of angle 34 of laterally inclined surface 28, ground speed of combine 10, soil or surface characteristics, number of tires, engine load, weight of grain, amount of fuel, characteristics of tires 14, 16, including material, number of plies, type and spacing of tread, and the like.

According to another aspect of the invention, system 30 includes a knowledge base including characteristics with weighted values. For example, at greater angles of inclination, the weight of the grain may be weighted more heavily because of height of the grain tank. In addition, certain combinations of factors, when present may be weighted more heavily.

Another embodiment of the invention includes monitoring a differentiation between at least two tires 14, 16 disposed on opposite sides of combine 10 for a threshold difference in loading conditions experienced by tires 14, 16 and/or a threshold difference between air pressure in tires 14, 16.

According to yet another embodiment of the invention, the predetermined amount of difference allowed between lateral tilt angle 36 and angle 34 of laterally inclined surface 28 is based on information representative of a vertical height of header 12. The predetermined amount is larger, allowing a greater difference between the angles, when header 12 is positioned at a larger vertical height. Conversely the predetermined amount is smaller, allowing less difference between the angles, when header 12 is positioned at a lower vertical height. Thus, at lower vertical heights, where header 12 risks impacting with the ground when combine 10 is at a lateral tilt angle 36 that is greater than angle 34 of laterally inclined surface, system 30 provides tighter tolerances.

Still another embodiment of system 30 includes an operator override capability 44, wherein the operator can manually override the automatic adjustment of angle 38 of lateral tilt of the header and controller 30 is configured and operable to learn from the override.

According to another aspect of the invention, lateral inclination sensor 22 may be, for instance, an inclinometer of the type that is commonly used with a self-leveling grain cleaning system 24 within combine 10 or any other suitable device capable of providing information representative of lateral tilt angle 36 of combine 10.

In light of all the foregoing, it should thus be apparent to those skilled in the art that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. An automatic lateral tilt control system for a header of an agricultural plant cutting machine, comprising:
   at least one driver connected to the header and configured so as to be controllably operable by a header tilt command input for varying an angle of lateral tilt of the header relative to the plant cutting machine;
   a lateral inclination sensor configured and operable for providing information representative of a lateral tilt angle of the machine relative to a reference; and
   a controller programmed and operable for automatically monitoring the information representative of the lateral tilt angle of the machine and at least one additional characteristic, wherein the controller calculates a predicted angle representative of the laterally inclined surface to the reference, the predicted angle is calculated from the lateral tilt angle of the machine and the at least one additional characteristic, and when the machine is disposed on a laterally inclined surface and the machine is tilted, the inclination sensor provides information of the lateral tilt angle of the machine relative to the reference to the controller, the controller compares the predicted angle with the tilt angel of the machine, if the difference between the predicted angle and the lateral tilt angle of the machine differs by at least a predetermined amount, then the controller responsively adjusts the angle of lateral tilt of the header relative to the machine, so an angle of lateral tilt of the header relative to the reference is at least substantially equal to the angle of the laterally inclined surface.

2. The system of claim 1, wherein the at least one additional characteristic includes a ground speed of the machine.

3. The system of claim 1, wherein the lateral inclination sensor is an inclinometer.

4. A method for automatically controlling the lateral tilt of a header of an agricultural plant cutting machine, comprising:
   providing at least one driver connected to the header and configured so as to be controllably operable for varying an angle of lateral tilt of the header relative to the plant cutting machine;
   providing a lateral inclination sensor configured and operable for providing information representative of a lateral tilt angle of the machine relative to a reference;
   providing a controller programmed and operable for:
   automatically monitoring the information representative of the tilt angle of the machine and at least one additional characteristic;
   calculating a predicted angle representative of an angle of the laterally inclined surface to the reference, the predictive angle is calculated from the lateral tilt angle of the machine and the at least one additional characteric; and when the machine is disposed on a laterally inclined surface, the inclination sensor provides information of the lateral tilt angle of the machine to the controller, the controller compares the predicted angle with the tilt angle of the machine, if the difference between the predicted angle and the lateral tilt angle of the machine differs by at least a predetermined amount, the controller responsively adjusts the angle of lateral tilt of the header relative to the machine so an angle of lateral tilt of the header relative to the reference is at least substantially equal to the angle of the laterally inclined surface.

5. The method of claim 4, wherein the at least one additional characteristic includes a rate of change of the lateral inclination of the machine relative to the predetermined reference.

6. The method of claim 4, wherein the at least one additional characteristic includes a ground speed of the machine.

7. The method of claim 4, wherein the at least one additional characteristic includes a differentiation between at least two tires disposed on opposite sides of the machine.

8. The method of claim 7, wherein the differentiation between the tires is a load differentiation.

9. The method of claim 7, wherein the differentiation between the tires is an air pressure differentiation.

10. The method of claim 4, wherein the at least one additional characteristic is a vertical height of the header relative to the reference and the predetermined amount is larger when the header is positioned at a higher vertical height and the predetermined amount is smaller when the header is positioned at a lower vertical height.

11. The method of claim 4, wherein the system includes a knowledge base including characteristics having weighted values.

12. The method of claim 4, further allowing an operator to manually override the automatic adjustment of the angle of lateral tilt of the header and the controller is configured and operable to learn from the override.

13. The method of claim 4, wherein the lateral inclination sensor is an inclinometer.

* * * * *